United States Patent [19]

Martin et al.

[11] Patent Number: 4,588,175
[45] Date of Patent: May 13, 1986

[54] TORSION SPRING APPARATUS AND METHOD

[75] Inventors: David O. Martin, Salt Lake City; Lawrence G. Martin, Bountiful, both of Utah

[73] Assignee: Martin Door Manufacturing, Salt Lake City, Utah

[21] Appl. No.: 660,449

[22] Filed: Oct. 12, 1984

Related U.S. Application Data

[63] Continuation-in-part of Ser. No. 428,106, Sep. 29, 1982, abandoned.

[51] Int. Cl.4 .............................................. F16F 1/16
[52] U.S. Cl. ................................................. 267/155
[58] Field of Search ..................... 267/57, 58, 155, 157

[56] References Cited

U.S. PATENT DOCUMENTS 1,872,872 8/1932 Bendix ............................. 267/155 X Primary Examiner—Duane A. Reger
Attorney, Agent, or Firm—J. Winslow Young

[57] ABSTRACT

The present invention relates to a novel torsion spring apparatus and method wherein anchor loops are formed in the end coil of the torsion spring to permit anchoring the spring directly to the appropriate mounting bracket. The provision of anchor loops in the end coil of the torsion spring effectively eliminates the requirement for conventional mounting inserts for the torsion spring and simultaneously increases the effective length of the torsion spring or, alternatively, permits the torsion spring to be shortened by the number of coils that would be otherwise rendered ineffective by the presence of a prior art insert.

7 Claims, 7 Drawing Figures

TORSION SPRING APPARATUS AND METHOD

RELATED INVENTIONS

This application is a continuation-in-part of application Ser. No. 06/428,106 filed Sept. 29, 1982, now abandoned.

BACKGROUND

1. Field of the Invention

This invention relates to a torsion spring and, more particularly, to a novel torsion spring apparatus and method for fabricating and mounting a torsion spring.

2. The Prior Art

Torsion springs are well-known in the art and are used for numerous applications. The torsion spring derives its name from the characteristic of its being twisted or placed under torsion forces to create the spring action. One particular type of torsion spring is designed as an elongated coil spring with one end anchored to a fixed surface with the other end mounted to achieve movement around an axis. A support rod is mounted coaxially in the spring and serves as a stabilizer to prevent the spring from buckling excessively at the extremes of travel, while serving as the axis of rotation.

Conventionally, the ends of the torsion spring are secured to their respective mountings by use of a mounting apparatus usually consisting of a conical or cylindrical insert which is placed into each end of the spring. The last several coils of the torsion spring are secured to the insert with the result that the effective length (active coils) of the spring is reduced by the number of coils (inactive coils) secured to the insert.

One specific application for a torsion spring is as a device to balance or compensate for the weight of an overhead, sectional door with the tension of the spring. Overhead sectional doors are found in commercial as well as residential applications and are customarily used as doors for wide entrances such as garages and the like. The overhead sectional door consists of a plurality of horizontal sections hingedly joined along abutting edges and are mounted in tracks at each end. The tracks are vertical at each side of the entrance into a horizontal section. The horizontal section supports the door overhead in a position horizontal to the floor. Therefore, the common name for the door is that of an overhead sectional door.

Clearly, of course, the entire weight of the door must be lifted vertically to open the door to place it in the horizontal overhead position. With most overhead sectional doors this weight can be substantial. It is, therefore, common to provide a coiled, torsion spring apparatus wherein the torsion spring is placed under sufficient tension to balance the weight of the overhead. The spring is under the greatest tension when the overhead sectional door is in the closed position and the least tension when the door is in the open position since very little weight of the door needs to be supported when the door is lifted to the horizontal position. Therefore, in order to provide the greatest service life to the torsion spring without exceeding the elastic limit of the spring material, it is desirable to have as many active coils of the torsion spring available for service as possible while providing the greatest possible anchor safety for the spring while it is under tension.

It would, therefore, be a significant advancement in the art to provide a novel torsion spring apparatus and method of fabrication wherein the conventional inserts are eliminated and the last coil of the torsion spring is configured into the anchor mechanism for the torsion spring. Hard-drawn MB (Medium Bessemer) spring wire preferentially is used to fabricate smaller wire springs and, more particularly, the tightly bent anchor loops in the spring since oil tempered spring wire is more brittle and has a tendency to break when bent into short radius bends. Such a novel torsion spring apparatus and method of fabrication is disclosed and claimed herein.

BRIEF SUMMARY AND OBJECTS OF THE INVENTION

The present invention relates to a novel torsion spring apparatus and method of fabrication wherein the end coils of the torsion spring are configured into the anchor mechanism for the torsion spring. The fabrication of the anchor mechanism in the last coil of the torsion spring effectively eliminates the need for an anchor insert into the spring. The effective length of the spring is thus increased by at least four or more coils at each end or the length of the spring may be decreased by that number of coils thereby providing a savings in material and fabrication costs.

It is, therefore, a primary object of this invention to provide improvements in torsion springs.

Another object of this invention is to provide improvements in the method of fabricating and mounting torsion springs.

Another object of this invention is to provide an improved torsion spring wherein the last coil of the torsion spring is configured as the anchoring mechanism for anchoring the end of the torsion spring.

Another object of this invention is to effectively eliminate anchor inserts to the torsion spring thereby increasing the effective length or number of active coils of the torsion spring.

These and other objects and features of the present invention will become more fully apparent from the following description and appended claims taken in conjunction with the accompanying drawings.

DETAILED DESCRIPTION OF THE PREFERRED EMBODIMENT

Figure 1:
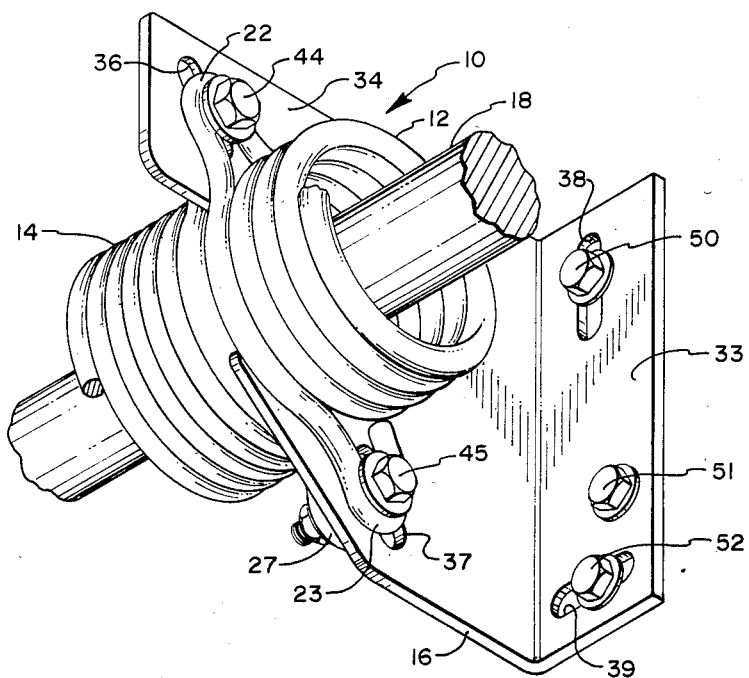
FIG. 1 is a perspective view of the preferred embodiment of a torsion spring invention with portions broken away for ease of presentation and understanding of the invention.
Figure 2:
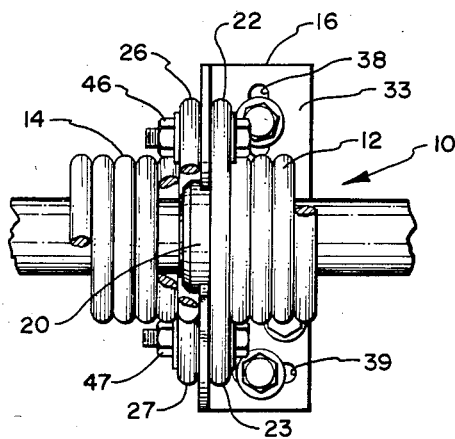
FIG. 2 is a plan view of the novel torsion spring apparatus of FIG. 1 with portions broken away to reveal internal construction.
Figure 3:
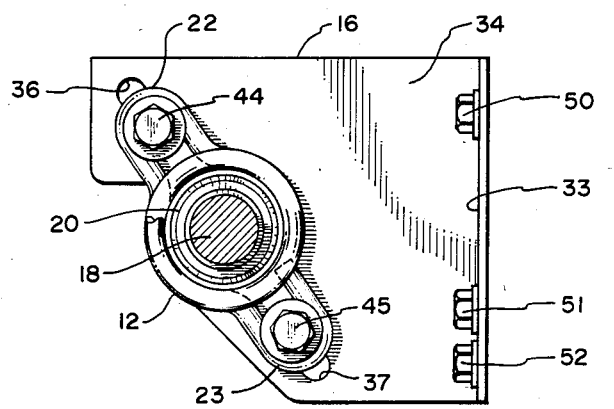
FIG. 3 is an end view of the torsion spring apparatus of this invention shown in FIG. 2.

The invention is best understood by reference to the drawing wherein like parts are designated with like numerals throughout.

Referring now to FIGS. 1-4, the novel spring apparatus of this invention is shown generally at 10 and includes torsion springs 12 and 14 mounted to a bracket 16 in combination with a support rod 18. The last coil of spring 12 is formed into anchor loops 22 and 23 while the last coil of spring 14, shown herein as coil 28, is formed into anchor loops 26 and 27. Springs 12 and 14 are mounted over each end of support rod 18 and are bolted to bracket 16 by bolts 44 and 45. Bolts 44 and 45 pass through slots 36 and 37, respectively, in bracket 16 and are secured thereto by threaded nuts 46 and 47, respectively.

Support rod 18 is rotatably mounted to bracket 16 by a bearing 20 adapted to be secured to bracket 16. In particular, bracket 16 includes an open slot 30 having parallel edges 31 and 32 which receive notches 40 and 41, respectively, in the outer surface of bearing 20. Bearing 20 is customarily fabricated from a high density plastic material such as nylon with grease grooves (not shown) which acts as the wearing surface when support rod 18 is rotated during normal operation.

With particular reference to FIG. 1, bracket 16 is adapted to be mounted to a wall surface by having plate 33 snugly fastened thereto by means of a plurality of bolts, bolts 50-52 passing through slots 38 and 39 therethrough. Bracket 16 is essentially a conventional bracket and is specifically adapted to receive the anchor loops mounted thereto in slots 36 and 37 in the outwardly extending flange 34 of bracket 16.

From the foregoing, it is clear that the novel torsion spring apparatus and method of this invention is less expensive to fabricate since it completely eliminates the requirement for any kind of conventional mounting insert (not shown) for mounting springs 12 and 14 to bracket 16. This novel invention advantageously increases the effective length of the respective torsion springs by the number of coils customarily rendered inactive by the presence of the prior art inserts (not shown). Alternatively, the overall length of torsion springs 12 and 14 can be effectively reduced by elimination of those coils which otherwise are rendered ineffective by the presence of the prior art inserts (not shown). In either instance, the torsion spring apparatus of this invention is more quickly and readily mounted to flange 34 of bracket 16 by the operator (not shown) simply passing bolts 44 and 45 through the respective anchor loops 22, 23, 26 and 27 of the respective torsion springs 12 and 14 and thereafter securely fastening the same with nuts 46 and 47. Accordingly, there is a substantial savings in materials, parts and installation labor as well as having a less expensive torsion spring.

Preferentially, a hard-drawn MB spring wire is used to fabricate the novel spring apparatus of this invention since hard-drawn spring wire is less susceptible to breaking when bent sharply into anchor loops 22, 23, 26 and 27. Oil-tempered spring wire, on the other hand, tends to be more brittle so that it will break more readily if handled according to the fabrication technique necessary to produce the desired spring.

Figure 4:
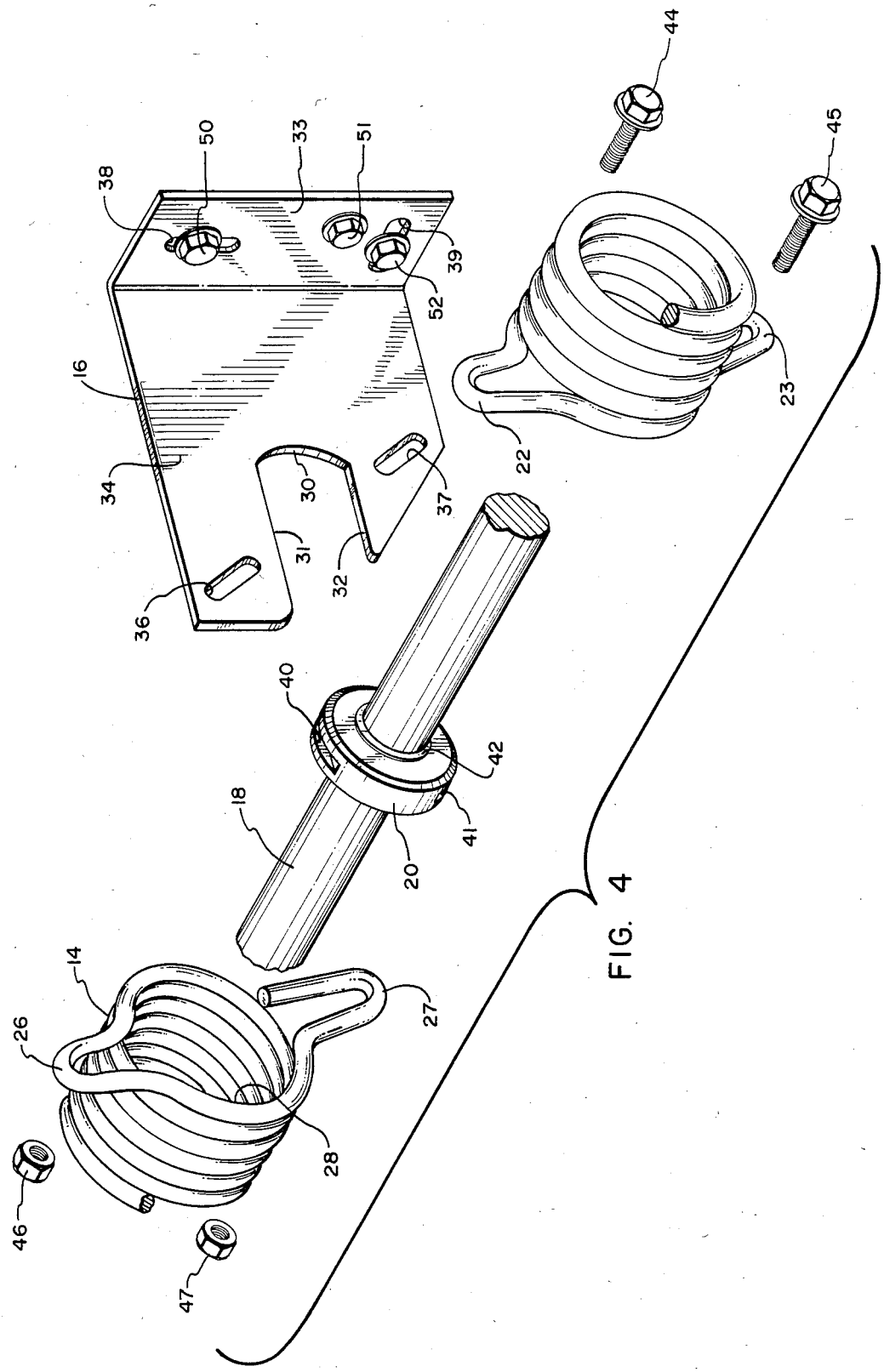
FIG. 4 is an exploded, perspective view of the novel torsion spring and mounting apparatus of this invention.
Figure 5:
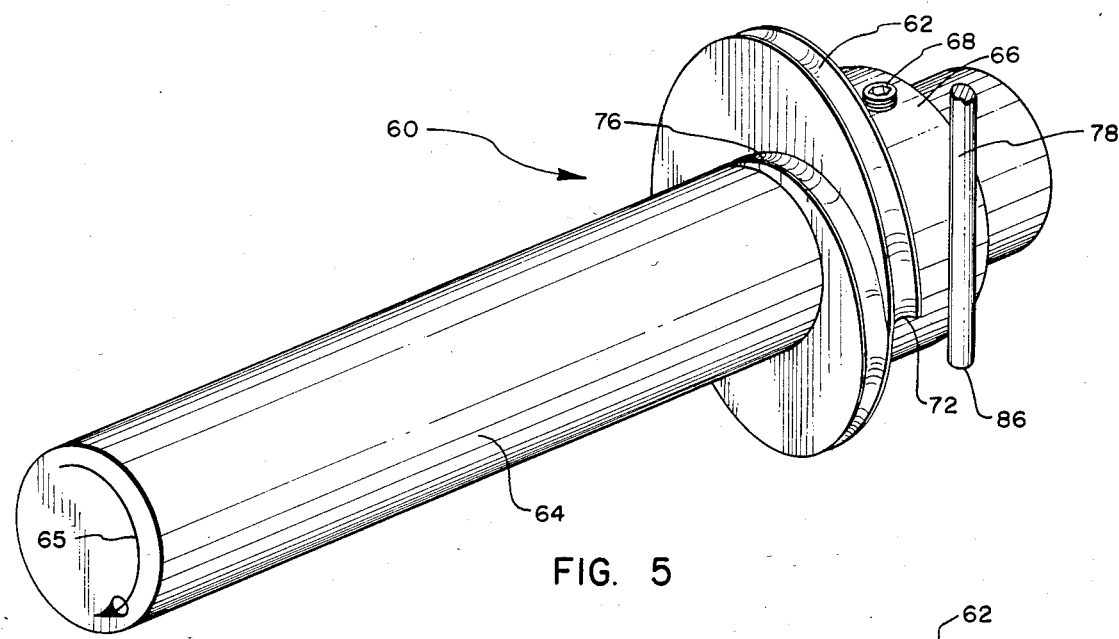
FIG. 5 is a perspective view of a portion of a cylindrical mandrel with a spiral mandrel mounted thereto.
Figure 6:
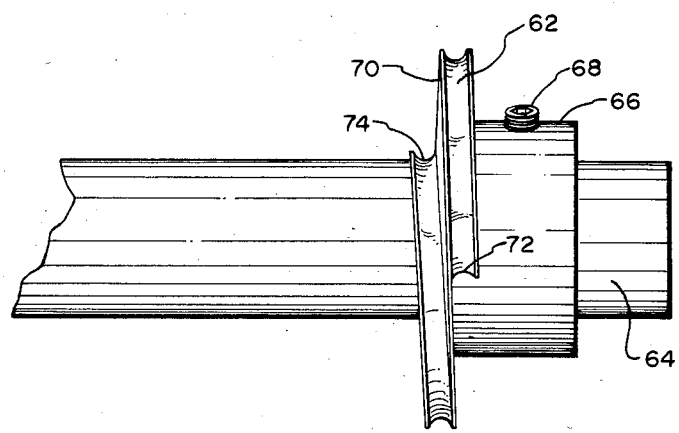
FIG. 6 is a plan view of the scroll mandrel of FIG. 5.
Figure 7:
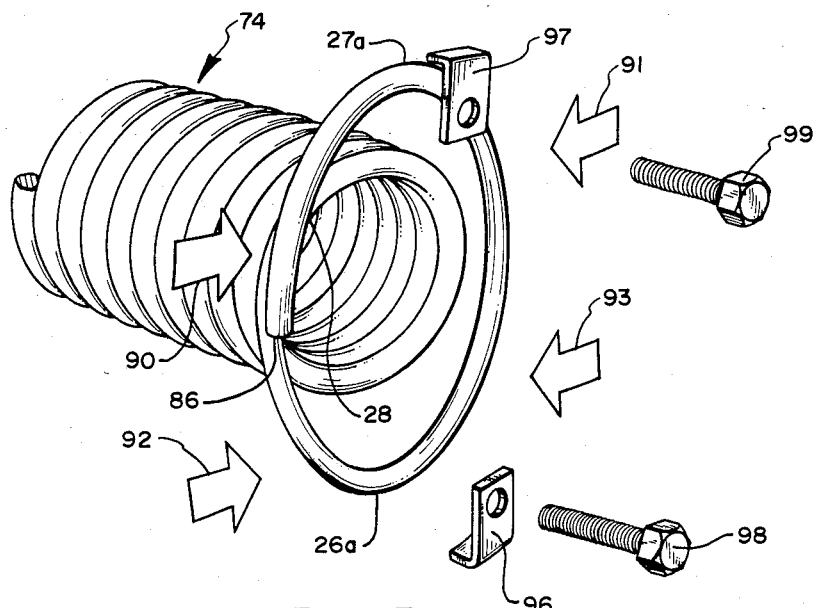
FIG. 7 is a perspective view of the end of a spring fabricated on the cylindrical mandrel and spiral mandrel of FIG. 5 and shown in the environment of schematically illustrated shaping forces.

Referring now more particularly to FIGS. 5-7, the mandrel apparatus to form hard-drawn spring wire into spring 14 is shown generally at 60 and includes a spiral mandrel 62 mounted to a cylindrical mandrel 64 and secured thereto by a set screw 68 in hub 66. Spiral mandrel 62 is configured with a generally elliptical shape so as to produce the elliptical contour of anchor loops 26a and 27a (FIG. 7). Anchor loops 26a and 27a are designated such to distinguish them from anchor loops 26 and 27 (FIGS. 1 and 4). Anchor loops 26a and 27a can be diametrally foreshortened from the elliptical shape shown by the application of bending forces 90-93 (schematically illustrated in FIG. 7) for smaller wire sizes or alternatively left in their present elliptical condition and anchored with clips 96 and 97 by bolts 98 and 99, respectively for larger wire sizes.

Spiral mandrel 62 includes a beginning end 72 of the elliptical spiral configuration and continues in a uniform, elliptical spiral as shown with a decreasing diameter until it corresponds with the outside diameter of cylindrical mandrel 14 at terminus 76. A circumferential groove 74 is formed in the external surface of spiral mandrel 62 and serves as a wire-receiving groove for hard-drawn spring wire 78 with an end 86 placed in juxtaposition with beginning end 72.

Spring 14 is wound over spiral mandrel 62 and then over cylindrical mandrel 64 thus leaving anchor loops 26a and 27a formed therein. Anchor loops 26a and 27a can be used as anchor loops by use of clips 96 and 97 in conjunction with bolts 98 and 99, respectively or formed into anchor loops 26 and 27 (FIGS. 1 and 4) by bending forces 90-93. Either are especially useful since they eliminate the need for additional deformation of the elliptical shape of anchor loops 26a and 26b while permitting the use of hard-drawn wire.

THE METHOD

Spiral mandrel 62 is prepared with preselected dimensions to accommodate the formation of coil 28 such that anchor loops 26a and 27a are readily formed therein. Correspondingly, the dimensions of groove 74 is selectively predetermined so as to correspond with the outside diameter of wire 78. Spiral mandrel 62 is adjustably mounted to cylindrical mandrel 64 by set screw 18 in order to provide the predetermined length to the body of spring 14.

The formation of spring 14 with loop 28 formed therein is commenced by securement of end 86 of hard-drawn wire 78 adjacent beginning end 72 of scroll mandrel 62. Cylindrical mandrel 64 and spiral mandrel 62 are rotated as shown by arrow 65 while spring wire 78 is fed into groove 74 causing wire 78 to be formed about spiral mandrel 62 and then about cylindrical mandrel 64. Thereafter, a second loop may be formed in the other end of wire 78 by a second spiral mandrel (not shown) similar to spiral mandrel 62. Right-wound or left-wound is determined by the direction of the axis of rotation of spiral mandrel 62.

Spring 14 is then removed from the mandrels and either used as formed after suitable heat treatment or subjected to bending forces 90-93 to create anchor loops 26 and 27. Advantageously, either configuration represents a novel improvement of this invention over the prior art.

The invention may be embodied in other specific forms without departing from its spirit or essential characteristics. The described embodiments are to be considered in all respects only as illustrative and not restrictive and the scope of the invention is, therefore, indicated by the appended claims and foregoing description. All changes which come within the meaning and range of equivalency of the claims are to be embraced within their scope.

What is claimed and desired to be secured by United States Letter Patent is:

1. A torsion spring apparatus and mounting assembly comprising:
   a bracket for mounting to a surface and comprising a slot;
   a support rod;
   bearing means on the support rod for mounting the support rod in the slot of the bracket in rotatable relationship to the bracket;
   a torsion spring apparatus mounted over the support rod on each side of the bracket; and
   securement means on the torsion spring for mounting the torsion spring to the bracket comprising anchor loops formed in the adjacent end of the torsion spring.

2. The torsion spring and mounting assembly defined in claim 1 wherein the bearing means comprises a sleeve and a cylinder mounted to the sleeve, the cylinder comprising notches for engagedly receiving the edges of the slot in the bracket.

3. The torsion spring and mounting assembly defined in claim 2 wherein the sleeve comprises a metallic member having diametrally enlarged ends and the cylinder comprises a plastic molded to the sleeve.

4. The torsion spring apparatus and mounting assembly defined in claim 1 wherein the securement means for each torsion spring comprises a pair of diametrally opposed loops formed in the last coil of the torsion spring, each loop serving as a bolt-receiver for a bolt passing through a corresponding adjacent hole in the bracket.

5. A torsion spring and mounting assembly comprising:
   a bracket comprising an L-shaped member having a foot and an upright, the foot having holes therein for securing the bracket to a surface, the upright having an open slot and a pair of bolt-receiving holes;
   a support rod;
   bearing means for mounting the support rod in the slot in rotatable relation to the bracket;
   a first torsion spring and a second torsion spring mounted to the support rod on each side of the bracket; and
   mounting means for mounting each torsion spring to the bracket comprising a pair of bolt-receiving loops formed in adjacent ends of the last coil of each torsion spring, each loop corresponding to a bolt-receiving hole in the bracket.

6. The torsion spring and mounting assembly defined in claim 5 wherein the bearing means comprises a sleeve and a cylinder mounted to the sleeve, the cylinder comprising notches for engagedly receiving the edges of the slot in the bracket.

7. The torsion spring and mounting assembly defined in claim 6 wherein the sleeve comprises a metallic member having diametrally enlarged ends and the cylinder comprises a plastic molded to the sleeve.

* * * * *